UNITED STATES PATENT OFFICE.

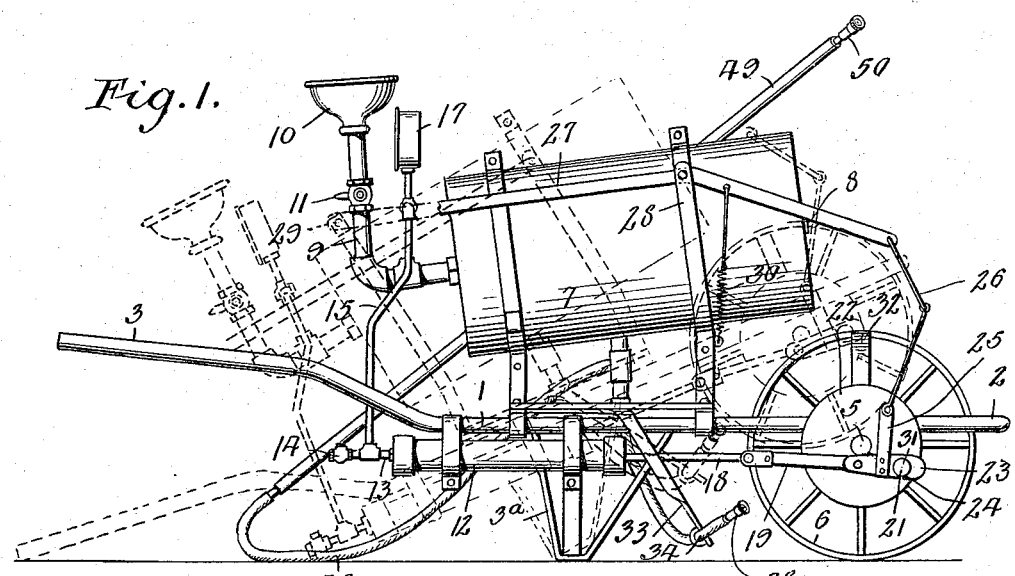
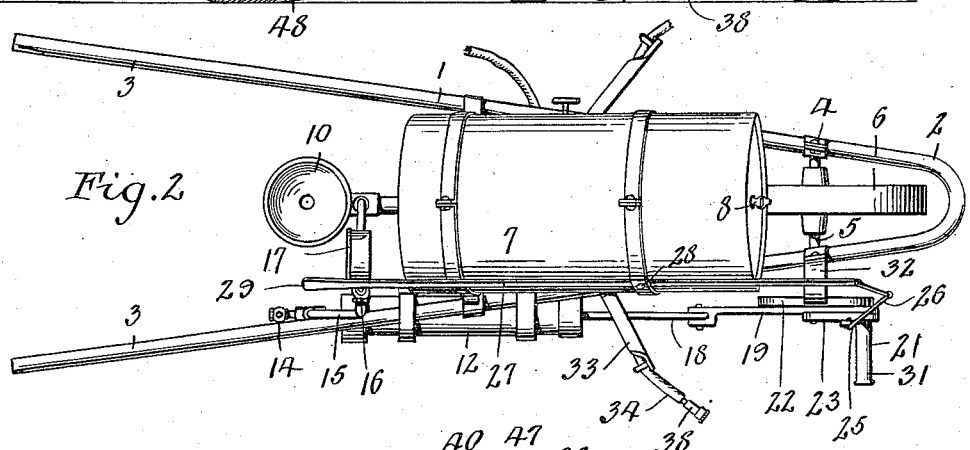
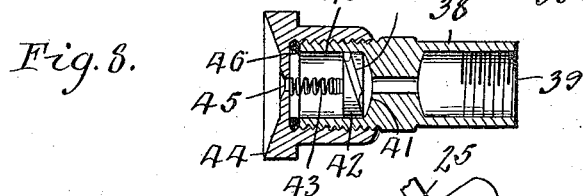
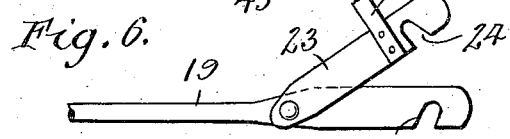

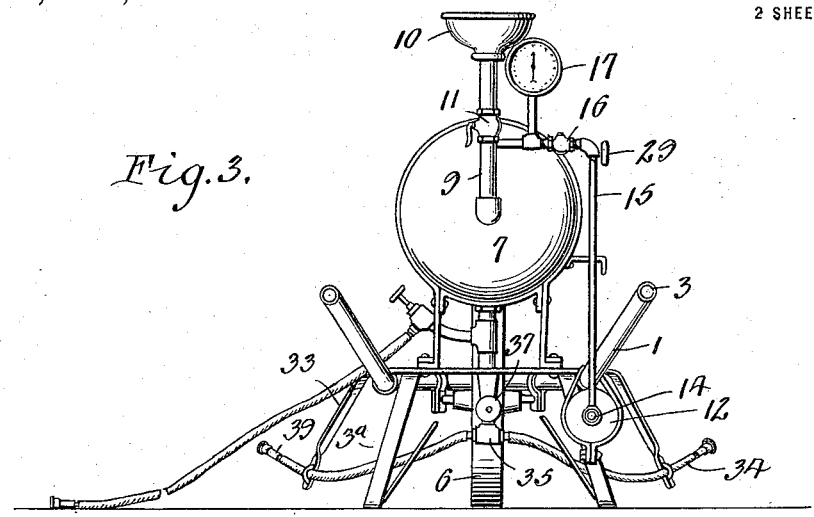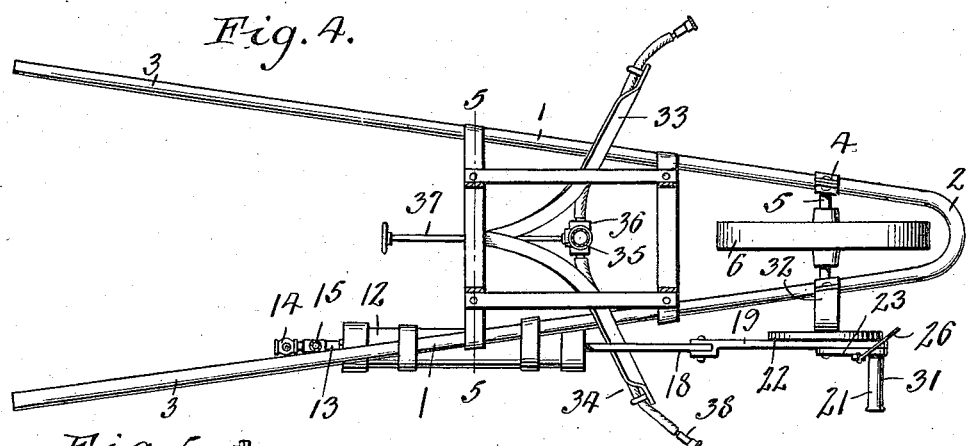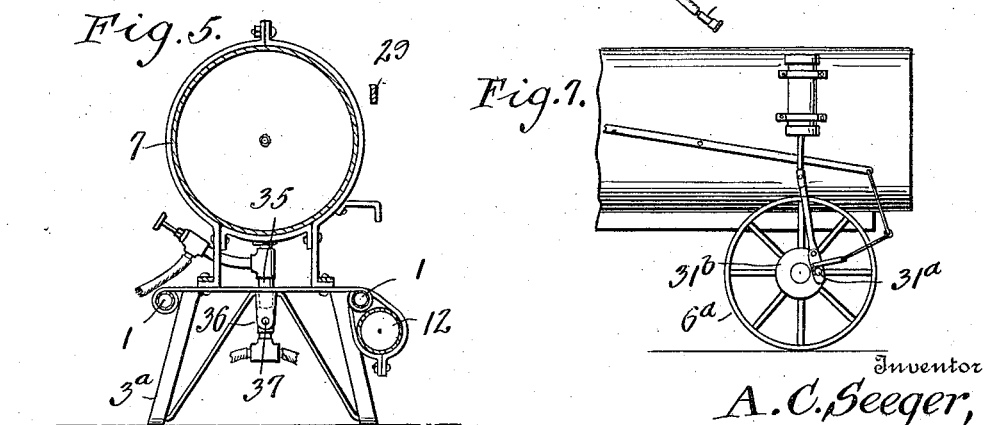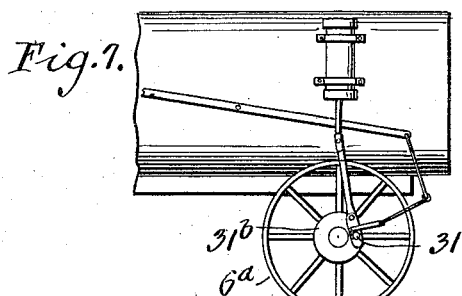

AUGUST C. SEEGER, OF EAST ST. LOUIS, ILLINOIS.

SPRAYING-MACHINE.

1,174,905.  Specification of Letters Patent.  Patented Mar. 7, 1916.

Application filed April 17, 1915. Serial No. 22,068.

*To all whom it may concern:*

Be it known that I, AUGUST C. SEEGER, a citizen of the United States, residing at East St. Louis, in the county of St. Clair and State of Illinois, have invented new and useful Improvements in Spraying-Machines, of which the following is a specification.

This invention relates to improvements in portable sprayers, for spraying trees, plants and flowers, and one object of the invention is to provide a portable sprayer which is effectually adapted both for spraying plants and flowers close to the ground and for spraying trees or vines, etc., at any ordinary elevation above the ground surface.

Another object of the invention is to provide a portable sprayer of the wheeled type embodying a pump for supplying compressed air to the fluid reservoir, which pump may be driven automatically in the travel of the sprayer from place to place or by hand when the sprayer is in a standing position.

A further object of the invention is to provide a sprayer which is simple of construction, reliable and efficient in action, contains comparatively few parts, and which are not liable to get out of order, which may be conveniently transported and manipulated, and which is strong and durable.

A still further object of the invention is to provide spraying devices, including nozzles, which will spray the fluid with a desired force and spread and which will be self-cleansing in action at all ordinary times, but which if choked may be readily and conveniently cleaned.

The invention consists of the features of construction, combination and arrangement of parts herein fully described and claimed, reference being had to the accompanying drawings in which:—

Figure 1 is a view in side elevation of a portable sprayer embodying my invention, showing in dotted lines a position to which the device may be tilted to raise the supporting wheel from the ground. Fig. 2 is a top plan view of the sprayer. Fig. 3 is a rear end elevation. Fig. 4 is a sectional plan view. Fig. 5 is a transverse section on line 5—5 of Fig. 4. Fig. 6 is a detail view showing the construction of the connecting rod and its latch. Fig. 7 is a view illustrating a modification. Fig. 8 is a detail view of the nozzle.

The apparatus comprises a V-shaped frame including side bars 1 integrally connected at their forward ends, as indicated at 2 and provided with rear handle extensions 3, a single-piece frame of the construction described, made of a rod or pipe being preferably employed. The side bars of the frame are provided with supporting feet 3ᵃ at their forward ends to support bearings 4 for a shaft or axle 5 carrying a supporting wheel 6, on which the apparatus as a whole is supported, so that it may be trundled, wheel-barrow style, from place to place and suitably supported in a horizontal position by allowing the feet 3 to come in contact with the ground.

Suitably supported upon and from the frame is a horizontally extending tank or reservoir 7 containing the fluid to be sprayed, and also containing a store of air under pressure, whereby the fluid is discharged. This tank or reservoir is provided at its forward end with a pet-cock 8 or other indicating means whereby the maximum level of the fluid is gaged, allowing the operator to determine when the fluid has reached such level in filling the reservoir. At its rear end the tank is provided with a fluid inlet pipe or filling pipe 9 carrying a filling funnel 10 and provided with a controlling or cut-off valve 11.

Supported at one side of the frame is a pump 12, including a cylinder and piston, for supplying compressed air to the tank or reservoir. This pump has its cylinder provided with an inlet and discharge pipe or connection 13 at its rear end, having therein a check valve 14 for permitting air to enter, while preventing its escape. Communicating with this pipe 13 and leading therefrom to the tank is an air supply pipe 15, through which the compressed air is delivered from the pump to the tank or reservoir, said pipe 15 being provided with a check valve 16 and a pressure gage 17 for obvious purposes.

The pump is adapted to be operated automatically or by hand through the medium of the running gear of the apparatus, which includes the axle 5 and supporting wheel 6. As shown, the pump piston or plunger rod 18 is pivoted at its outer end to a connecting rod or member 19 having at its forward end a slot 20 to receive and engage a crank pin 21 and a crank wheel or disk 22 fixed to the axle 5, and pivotally mounted on the connecting rod or member 19 is a latch device 23 having its free end provided with a slot 24 also adapted to receive and engage the crank pin 21, the slots of the rod and latch having their entrance portions arranged at an angle so as to be closed when said elements are engaged with the crank pin, thereby coupling the piston to the crank wheel so that in the forward travel of the apparatus, the pump will be operated to supply compressed air. It will thus be understood that while the apparatus is being transported from place to place the pump may be automatically operated to replenish the reservoir to the degree of pressure desired.

The latch 23 is provided with an arm 25 which is coupled by a suitable flexible or link connection 26 with the forward end of a controlling lever 27 fulcrumed upon a bracket 28 and formed or provided at its rear end with a handle 29 whereby it may be moved in a vertical plane. A spring 30 suitably connects the forward end of the lever with the framework and operates to hold the same normally depressed so that the connecting rod and latch may move downwardly to engage the crank pin and may have motion with the latter when connected therewith, but it will be understood that by depressing the handle 29 and raising the forward end of the lever the latch may be disconnected from the crank pin and with the connecting rod raised to a position clear of the crank disk, so as to throw the pump out of action whenever desired.

When the apparatus is in use it may be tilted back to an inclined position and supported by the feet 3ª and handles 3 and the connecting rod disconnected, whereby the wheel 6 will be raised from the ground, allowing the crank disk to be rotated by means of a handle 31 to permit the pump to be manually actuated to replenish the reservoir with air during the spraying operation. A guide member or deflector 32 is provided upon the frame and overhangs the crank disk to prevent the connecting rod from dropping down behind said disk and becoming bound in its adjusting movement.

Arranged at the sides of the frame and extending outwardly therefrom are brackets or outriggers 33 which support the outer end of spray pipes 34 communicating at their inner ends with the reservoir through a connection 35, which connection is provided with a controlling valve 36 adapted to be operated by a rearwardly extending controlling rod or shaft 37, allowing the operator while trundling the device for spraying rows of growing vegetation or plants to also control the discharge of the fluid. The spray pipes carry nozzles 38 each comprising a body portion 39 provided at its outer end with a chamber 40 and a seat 41 for a spray valve 42 disposed within said chamber and having fixed to the outer side thereof one end of a coiled seating spring agitator 43. The outer end of the body 39 is internally threaded to receive a cap or tip 44 provided with an outlet 45 through which the fluid is sprayed, a gasket 46 being interposed between said cap and the outer edge of the body to maintain a fluid-tight joint. The fluid forced outwardly under a determined air pressure from the reservoir acts upon the valve or disk 42 to force it outward to the limit afforded by the compression of the spring 43, which is of sufficient strength to ordinarily hold the disk substantially seated. As shown, the disk is provided with a spiral groove 47 through which the fluid finds its way, the fluid passing into the chamber 40 and between the coils of the spring and being thereby atomized and discharged in the form of a fine spray through the outlet 45, by which a spray of the desired degree of fineness and area is produced. A rear discharge pipe 48 is also provided, and this pipe may be wholly or partly of an elastic nature, and it is adapted to be coupled to an extension pipe 49 provided with a nozzle 50 of the construction described. This extension may be of any suitable length and is designed particularly for use in overhead spraying, so that elevated vines or limbs of trees may be readily and conveniently sprayed.

Instead of mounting the reservoirs upon a frame of the wheel-barrow type, the parts of the apparatus may be mounted upon any other vehicle running gear, such as that of the wagon type and which includes front and rear axles and wheels. In such a structure the pump may be vertically mounted upon the tank or vehicle body and the connecting rod and latch may be arranged to engage a crank pin 31ª on a band or disk 31ᵇ mounted upon the axle or hub of one of the supporting wheels 6ª, as shown in Fig. 7.

From the foregoing description, taken in connection with the drawings, the construction and mode of operation of my improved portable sprayer will be readily understood, and it will be seen that the invention provides a sprayer which is simple of construction, compact in character, and adapted to be readily and conveniently transported. It will also be seen that the compressed air for discharging the fluid may be supplied to the tank from a pump which may be operated automatically when the apparatus is in course of transit or may be operated manually at any other time, the advantages of which will be apparent.

I claim:—

1. A sprayer comprising a portable frame having a ground wheel, supporting feet and handles and adapted to rest upon the wheel and feet or upon the feet and handles, a reservoir for a spray liquid mounted on said frame, a pump for supplying air under compression to said reservoir, a crank pin carried by the wheel, a connection between said crank pin and the pump piston, said connection being detachable from the crank pin, and a handle for manually rotating the wheel and crank pin when the device is tilted backwardly to rest upon the feet and handles.

2. An apparatus of the character described comprising a frame having a supporting wheel at the front thereof, handles at the rear thereof and depending feet between the wheel and handles, a reservoir for a spraying liquid mounted upon the frame, a pump for supplying compressed air to said reservoir, a spray pipe communicating with the reservoir, a crank disk connected with the wheel and provided with a crank pin, a connecting rod for coupling the pump piston to said crank pin, a latch for holding said rod in engagement with the crank pin, means for retracting said latch and moving the connecting rod out of engagement with the crank pin, and a handle for manually operating the crank pin when the device is tilted to raise the wheel clear of the ground.

3. A spraying apparatus including a portable frame having a front supporting wheel, rear handles and depending feet between the wheel and handle, a reservoir for a spray liquid mounted upon said frame, a pump for supplying air pressure to said reservoir, a connecting crank pin connected with the supporting wheel, a connecting rod pivoted to the pump plunger rod and having a slot to receive the crank pin, a slotted latch carried by said rod to engage the crank pin and hold the rod in engagement therewith, and means for releasing said latch from said crank pin and moving the coupling rod out of engagement therewith.

4. A spraying apparatus including a frame carrying a front supporting wheel, rear handles and depending feet between the wheel and handles, a reservoir mounted on the frame to contain a spray liquid, a pump for supplying compressed air to said reservoir, a spray pipe communicating with the reservoir, a disk fixed to the axis of the wheel and provided with a crank pin, a connecting rod coupled to the pump piston and provided with a slotted portion to engage the crank pin, a pivoted, slotted latch carried by the rod to engage the crank pin and hold the rod connected therewith, a pivoted lever, a flexible connection between one arm of the same and the latch whereby the latter may be released and the connecting rod moved out of engagement with the crank pin, and a spring for maintaining said lever in a determined position.

In testimony whereof I affix my signature in presence of two witnesses.

AUGUST C. SEEGER.

Witnesses:
  T. W. BRYANT,
  E. R. KLICK.

Copies of this patent may be obtained for five cents each, by addressing the "Commissioner of Patents, Washington, D. C."